US011933307B2

(12) United States Patent
Juul Nielsen et al.

(10) Patent No.: US 11,933,307 B2
(45) Date of Patent: Mar. 19, 2024

(54) METHOD FOR OPERATING AN ELECTRONICALLY CONTROLLED PUMP ASSEMBLY

(71) Applicant: GRUNDFOS HOLDING A/S, Bjerringbro (DK)

(72) Inventors: Henrik Juul Nielsen, Hjortshøj (DK); Mathis Dahlqvist, Vejle Øst (DK)

(73) Assignee: GRUNDFOS HOLDING A/S, Bjerringbro (DK)

(*) Notice: Subject to any disclaimer, the term of this patent is extended or adjusted under 35 U.S.C. 154(b) by 0 days.

(21) Appl. No.: 18/086,867

(22) Filed: Dec. 22, 2022

(65) Prior Publication Data

US 2023/0129537 A1 Apr. 27, 2023

Related U.S. Application Data

(63) Continuation of application No. 16/474,929, filed as application No. PCT/EP2017/083381 on Dec. 18, 2017, now Pat. No. 11,566,625.

(30) Foreign Application Priority Data

Dec. 30, 2016 (EP) .................................. 16 207 574

(51) Int. Cl.
*F04D 13/06* (2006.01)
*F04D 15/00* (2006.01)

(52) U.S. Cl.
CPC ......... *F04D 13/06* (2013.01); *F04D 15/0088* (2013.01); *F04D 15/0094* (2013.01); *F05D 2270/20* (2013.01)

(58) Field of Classification Search
CPC .. F04D 13/06; F04D 15/0088; F04D 15/0094; F05D 2270/20
See application file for complete search history.

(56) References Cited

U.S. PATENT DOCUMENTS 6,260,004 B1 7/2001 Hays et al.
2005/0158179 A1* 7/2005 Medizade ............ F04B 49/065 417/43
2007/0154319 A1* 7/2007 Stiles, Jr. .............. F04B 49/065 417/42
2007/0154323 A1* 7/2007 Stiles, Jr. ............ F04D 15/0077 417/44.1

(Continued)

FOREIGN PATENT DOCUMENTS

CN 101155995 A 4/2008
CN 101802413 A 8/2010

(Continued)

*Primary Examiner* — Bryan M Lettman
(74) *Attorney, Agent, or Firm* — McGlew and Tuttle, P.C.

(57) ABSTRACT

A method serves for operating an electronically controlled pump assembly (1), with which setting parameters of the pump (2) can be adjusted in an electronic control (6), for adaptation to the hydraulic demands of the location installation situation (4, 5). Operating data is registered during the operation of the pump assembly (1). After a predefined time and on the basis of the registered operating data, it is examined as to whether the pump assembly (1) has been set vis-à-vis the factory settings. If this is not the case a signal (11) is issued in order to point out the necessary setting.

6 Claims, 3 Drawing Sheets

(56) References Cited

U.S. PATENT DOCUMENTS

| | | | | |
|---|---|---|---|---|
| 2010/0300220 | A1* | 12/2010 | Vadstrup | F04B 51/00<br>73/865.9 |
| 2017/0107992 | A1* | 4/2017 | Cheng | F04D 27/001 |
| 2017/0268516 | A1* | 9/2017 | Oppermann | F24D 19/1012 |

FOREIGN PATENT DOCUMENTS

| | | | |
|---|---|---|---|
| DE | 19618462 | A1 | 11/1997 |
| DE | 102014226620 | A1 | 6/2016 |

* cited by examiner

METHOD FOR OPERATING AN ELECTRONICALLY CONTROLLED PUMP ASSEMBLY

CROSS REFERENCE TO RELATED APPLICATIONS

This application is a continuation of, and claims the benefit of priority under 35 U.S.C. § 120 of U.S. patent application Ser. No. 16/474,929 filed Jun. 28, 2019, which is a United States National Phase Application of International Application PCT/EP2017/083381, filed Dec. 18, 2017, and claims the benefit of priority under 35 U.S.C. § 119 of European Application 16 207 574.1, filed Dec. 30, 2016, the entire contents of which are incorporated herein by reference.

TECHNICAL FIELD

The invention relates to a method for operating an electronically controlled pump assembly with which setting parameters of the pump can be adjusted in an electronic control, for adaptation to the hydraulic demands of the location installation situation, and with which operating data of the pump assembly is registered during the operation, as well as to an electronic control of an electromotorically driven centrifugal pump assembly for carrying out the method according with means for adjusting setting parameters for the adaptation of the pump assembly to the hydraulic requirements of the local installation situation, wherein the control is configured in order to register and/or transfer operating data.

TECHNICAL BACKGROUND

Modern centrifugal pump assemblies, in particular electromotorically driven centrifugal pump assemblies, comprise an electric motor, in front of which a power converter/frequency converter is connected in series, so that the pumps can be operated in wide speed ranges and can thus also cover a comparatively large power spectrum. With circulation pump assemblies, it is counted as belonging to the state of the art for example to operate the pump at an arbitrary constant speed, but also to control the operation according to predefined pump curves. Regulations, which is to say closed-loop controls are mostly envisaged, and these are operated by way of hydraulic sensors or, as the case may be, also merely on account of the electrical values of the motor. Hence heating circulation pumps for example can be operated with constant pressure curves, with constant flow curves, with proportional pressure curves or the like. With pressure boosting facilities, so-called booster pumps, not only is the desired delivery pressure to be set, but also the switching points, at which a further pump is connected or disconnected.

Although this variance which rendered possible by the motor electronics permits a pump assembly to be energetically optimized with regard to the respective application case, this however assumes that the pump assembly has also been set accordingly, in order to thus be operated in an energetically optimized manner.

In practice however, there often arises the problem of the pump assemblies being installed and being brought into operation with the factory settings, which is to say that as a precaution, the setting is effected such that an undersupply or deficit can be ruled out. What therefore happens is that such pump assemblies which per se can be energetically operated in a very favorable manner, run for years with a poor efficiency and require more electrical energy than would actually be necessary, due an insufficient or incorrect setting of the parameters. Apart from the increased energy costs, this also often leads to the differential pressure produced by the pump being too high, and this excessive differential pressure can lead to unnecessary leakages in the system and to unnecessarily high noise emissions on the part of the pump.

SUMMARY

Against this background, it is the object of the invention to develop a method for operating an electronically controlled pump assembly, such that the problems mentioned above are avoided where possible. The electronic control of an electromotorically driven pump assembly should moreover be adapted for carrying out such a method.

The method according to the invention, for operating an electronically controlled pump assembly, with which, in an electronic control, setting parameters of the pump can be adjusted for adapting to the hydraulic demands of the local installation situation and with which operating data of the pump assembly is registered during operation, according to the invention is characterized in that after a predefined time and on basis of the registered operating data, it is examined whether the pump assembly can be operated in an energetically more favorable region or however it is at least examined as to whether all setting parameters have not been changed vis-à-vis a presetting, and a signal is then issued for changing the setting parameters, if it is ascertained that the pump assembly can be operated in an energetically more favorable region or that the setting parameters have hitherto not been changed vis-a-vis the presetting. The method should preferably take its course in an automated which is to say automatic manner, by way of it being implemented into the electronic control, as is yet described further below.

The basic concept of the invention is to carry out an examination after a predefined time, which either on account of the operating data registered within this time interval examines whether the pump assembly can be operated in an energetically more favorable region or however, if this examination cannot be carried out or does not lead to an unambiguous result, to at least examine whether the setting parameters of the pump assembly have actually ever been changed vis-à-vis the presetting, in order to then issue a signal, by way of which it can be recognized that a change of the setting parameters should at least be examined.

A pump assembly in the context of the invention can thereby be any electromotorically driven pump with an electronic control, with which the setting parameters of the pump can be changed for adapting to the hydraulic demands of the local installation situation. Here, it is typically the case of single-stage or multi-stage centrifugal pumps which are controlled by a power converter/frequency converter. A pump assembly in the context of the invention however can also be a number of individual pump assemblies which are operated by a common control, as is the case for example with booster facilities (i.e. booster pumps).

The issued signal can be formed for example for activating of control lamp provided on the pump assembly, for triggering an acoustic alarm or also for transferring a corresponding data set to a cloud-based data bank or to a server of the manufacturer and/or operator of the pump assembly.

The method according to the invention is usefully started with the installation of the pump assembly and it is then the factory presetting of the pump assembly which is the presetting. After a predefined time, it is then examined as to whether this factory presetting has been changed or not, and the corresponding signal is emitted in the case of no change.

Inasmuch as this is concerned, it is more favorable, if after a predefined time and on the basis of registered operating data, it is examined as to whether the pump assembly can be operated in an energetically more favorable region. For this, in a further development of the method according to the invention, one envisages using electrical operating data of the motor, in particular the electrical power of the motor which is available on the control side in any case and on the other hand hydraulic operating data of the pump, in particular the pressure and/or flow rate, for the energetic evaluation of the operating data. It is possible to analyse the energetic behaviour of the pump assembly without further data, on account of this. Thereby, the hydraulic power resulting from the hydraulic operating data is brought into relation with the electric power of the motor, in order to determine the efficiency of the assembly by way of this. The power of the electric motor is available on the part of the control electronics, and with regard to the hydraulic data, as a rule it is a pressure, typically the differential pressure mustered by the pump which is available by sensor, so that in combination with the speed which is likewise available at the motor side, the hydraulic power can be determined. Alternatively or additionally, the data of a flow sensor can be used for this. The hydraulic power as is known, results from the product of the differential pressure, the flow rate, the density of the delivery medium and the gravitational acceleration. With this data, the efficiency of the pump assembly can therefore be determined at certain points in time or also in a continuous manner, by way of the energetic evaluation of the operating data.

The operating data is advantageously registered, which is to say acquired and stored, in temporal intervals or in a continuous manner, in order to be able to carry out an efficiency examination after the predefined time. Thereby, it is useful to carry out such an efficiency testing not only from first starting operation, but also at regular time intervals. Thereby, it makes sense to set limit values, so as to keep the data quantity to be registered as low as possible, wherein it is merely the falling-short and exceeding of these limit values which is to be registered, or the temporal course of such a falling short and exceeding of the limit values. For example, one can specify the pump assembly determining its efficiency, thus the ratio between the hydraulic power and the electrical power, every six minutes, for determining the efficiency. If the limit value has been set to maximal 30%, then it is only the operating points, at which the efficiency factor is smaller than 0.7 which are to be registered. The number of operating points which in total are to be taken into account then results from the predefined time divided by six minutes. Not only can the method according to the invention be used for forcing an energetically favorable operation of the pump assembly, but it can also be used to determine and to display a significant under-dimensioning or over-dimensioning of the pump assembly.

It is particularly in the case of an interne connection of the pump assembly that in the ideal case, the method according to the invention leads to an automatic adaptation of the setting parameters of the pump assembly, if not only is the transfer and registering of the operating data of the pump assembly effected via a internet-based network, but also a corresponding adaptation of the setting parameters can be initiated after examination at the network side. However, this not only assumes a data connection of the pump assembly to the internet-based network, but also the possibility of changing these operating parameters via this network.

In the case of pump assemblies which do not envisage such an internet-based setting via a network, a data set with correspondingly adapted setting parameters can be provided at the network side for download, and these are downloaded by the service technician, for example on his smartphone, and then read into the electronic motor control on location. The method, with which the efficiency of the pump is examined, is ideally carried out in a continuous manner during the complete operational time. However, with regard to the large data quantity which is then to be registered and processed, in practise it is useful to examine within a relatively brief period of time after first starting operation, as to whether the pump assembly runs in an energetically favorable manner, and to then examine this later at larger time intervals. Inasmuch as this is concerned, it is advantageous to select the predefined time, in which the registering of the operating data is effected, between one hour and seven days. It can then be sufficient for the energy efficiency examination to be repeated after completion of a time interval, if the pump assembly has once firstly been brought into an energetically more favorable condition and the hydraulic boundary conditions or constraints no longer significantly change, as is often the case. Such a time interval typically lies between six months and five years, but can also be selected shorter in the individual case.

With existing pump assemblies, the method according to the invention can typically be implemented into the electronic motor control by way of a software update. However, the signal output is then constrained to the possibilities of the pump assemblies which are set with regard to hardware. For this reason, if the pump assembly has no network connection, in particular no internet connection, in the simplest form, a display, for example a red control lamp or a yellow flashing light is activated, and alternatively or additionally an acoustic signal is issued, so that anyone located in the proximity of the pump assembly is aware that the necessity of action evidently exists here. If a network connection exists, which is nowadays already the case with a multitude of in particular larger pump assemblies, it is then advantageous if the signal is transmitted in the form of a data package, via the internet-based network to the server, said server indicating to the manufacturer or the servicing company that a need for action is given here. In this case, it is advantageous if the data package contains the location data of the pump assembly, since a spatial assignment is then possible without having to access further person-related data bases.

The electronic control according to the invention, of an electromotorically driven centrifugal pump assembly serves for carrying out the method according to the invention. It thus comprises control means for adjusting setting parameters for adapting the pump assembly to the hydraulic demands of the local installation situation. These means can be formed by buttons/switches/touch screen which are on the assembly itself and with which the setting parameters can be changed, for example by way of selecting suitable regulation curves or pressure/flow setpoints. Such means however can also be formed in a wireless manner, for example by way of a mobile computer, typically smartphone or tablet, on which a corresponding software application runs, with which application this data can be inputted and transmitted in a wireless manner to the electronic control. These means can also be formed by transferring the respective settings via the network, in the case of a network connection of the electronic control.

The control itself can be configured to register and transfer operating data of the pump assembly. The method according to the invention, including the registering and evaluation of the registered data, depending on the available storage and computation capacity, can also be effected within the electronic control of the pump assembly or at least partly also via a network-connected server, to which server the electronic control is data connected.

According to the invention, the electronic control of the pump assembly however is configured in order itself to determine whether an adjustment of the setting parameters with vis-à-vis a registered setting has been effected after a predefined time, and to automatically output a signal if no setting has been effected. Basically, such an examination can be effected automatically by the control at regular intervals or also in a continuous manner. However, it is particularly advantageous if this predefined time first of all runs from starting operation of the control, and the registered setting is the factory setting. With this, it is ensured that when the pump assembly is installed at its designated location after delivery by the manufacturer and is connected to the electrical supply mains, it is monitored directly after first starting operation, at least as to whether the setting parameters have been changed vis-à-vis the factory settings or not. If it is not the case of the latter, and the signal prompting the adjusting of the setting parameter is issued, then it is to be assumed to a high probability that the pump assembly runs in a region which is not optimized with regard to the energy, since specifically no adjustment of the setting parameters has been effected whatsoever after installation and starting operation.

In an advantageous further development, the electronic control however is further configured to automatically determine whether the pump assembly is operated in an energetically favorable region or not. The storage and computation operations which are necessary inasmuch as this is concerned are however more complex, which is why these can advantageously also be effected externally via a network. For this, as well as for transferring the signal and/or the operating data, the control advantageously comprises an interface to a network, preferably to an internet-based network. Such an interface can be configured in a wire-connected manner, for example a LAN connection, but is particularly advantageously configured for wireless data transmission, for example by way of WLAN or mobile radio network communication.

Since pump assemblies are often arranged at regions which are not covered by mobile radio communication networks—be they underground or in cellars or basements—according to a further development according to the invention, it can be advantageous to configure the electronic control such that it is envisaged for the transmission of the setting parameters by way of a software application of a mobile input device, in particular a smartphone. Thereby, the mobile input device can create the connection to the network, which indeed does not have to be effected simultaneously. The setting parameters which are to be transmitted are then advantageously downloaded from the network by way of the mobile input device and subsequently transmitted into the electronic control.

According to a further development of the invention, one envisages storing the setting parameters in a file of the control and only a change of this file being monitored, so as to be able to realise the method according to the invention in an electronic control with as little as possible effort with regard to the hardware. A file in the context of this invention can also be a group of files or a folder, what is important is that the monitoring can be effected without a specific monitoring of the setting parameters themselves, but in a simple manner by way of monitoring the file which in the case of a change has a changed date or another characterization.

The setting parameters of the electronic control are advantageously one or more of the control variables such as delivery rate, delivery pressure, speed, power, wherein the delivery rate and/or delivery pressure as hydraulic variables can typically be set in the form of regulating curves.

The invention is hereinafter explained in more detail by way of embodiment examples represented in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
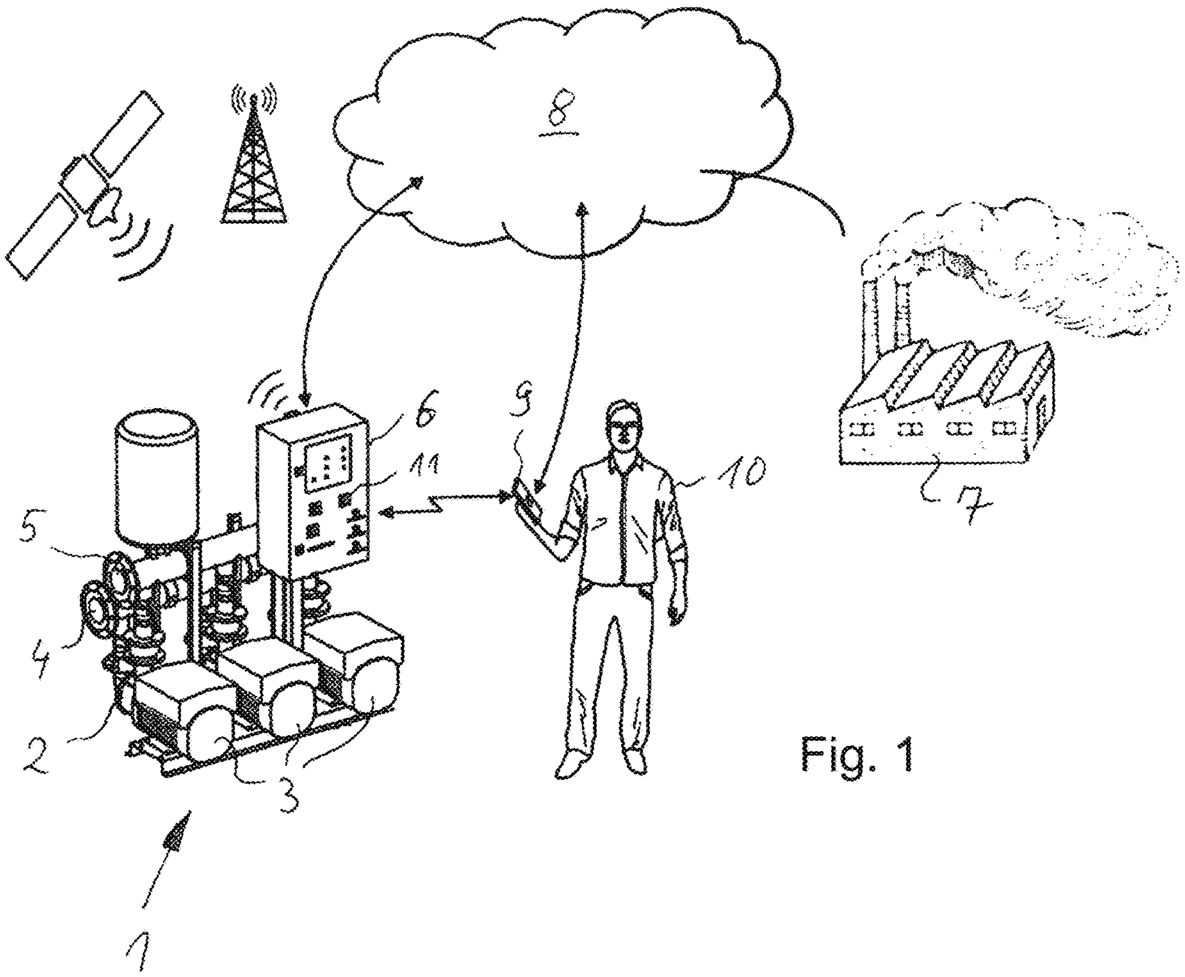
FIG. 1 is a schematic representation a cloud-based integration of an electronic motor control of a pump assembly.

Referring to the drawings, a pump assembly 1, a so-called booster pump, constructed from three centrifugal pumps 2 which are connected in parallel, are driven in each case by a frequency-converter-controlled electric motor 3 and which deliver from a common suction conduit 4 into a common delivery conduit 5, is represented in FIG. 1. The pump assembly 1 comprises a superordinate electronic control 6, into which setting parameters, in particularly the delivery pressure as well as the points of connection and disconnection of the individual pumps can be inputted. This electronic control comprises an interface to a network which is cloud-based. The control 6 is equipped with a WLAN module as well as with a mobile radio communication module, by way of which it is connected in a wireless manner to the network of the pump manufacturer 7 via the internet 8, thus the "cloud". The electronic control is moreover provided with a Bluetooth interface, via which it can communicate with a smartphone 9, via which smartphone an operator 10 can enquire and change the setting parameters which are available in the control 6. The smartphone 9 is likewise connected to the internet 8 via its radio interface and thus to the network of the manufacturer 7.

The electronic control 6 is configured to examine whether the setting parameters have been changed vis-à-vis the works settings which is to say factory settings, after a predefined time after having put the pump assembly 1 into operation. These parameters are digitally stored in a file of the control 6, and the control 6 monitors the storage date of the file. A time, which is set e.g. to 72 hours, starts from the first starting operation, so that after the completion of this predefined time, it is examined as to whether the storage date of the file has changed or not. If this is not the case, then a signal is outputted, and specifically to the control itself 6, for activating a warning lamp 11 which emits a flashing signal as an indication that the pump assembly 1 has not yet been adjusted. A corresponding data signal is simultaneously delivered to the network, so that this is noted in the data base of the manufacturer 7 whilst specifying the GPS data of the location of the pump assembly, and simultaneously a hint that this pump assembly is to be adjusted by a service technician appears. This necessary adjustment can be effected via the network itself or via the manufacturer 7 or operator, depending on the design and the connection to the network 8. A service technician, thus an operator 10 is necessary in the represented embodiment example, and with his smartphone 9 and a software application running thereon, the technician makes his way to the pump assembly 1, in order to accordingly adapt the setting parameters in the control 6 via his smartphone 9. Thereby, the service technician 10 via the network 8 not only receives the hint as to the fact that the pump assembly 1 is to be configured with regard to its setting parameters, but also the location data, and, inasmuch as present, the data for adapting the setting parameters and which can be downloaded from the network 8.

Apart from this device for monitoring the adjustment of the setting parameters, the electronic control 6 has a further function, with which the operating points are detected in temporal intervals of three minutes during operation of the pump assembly, and these are evaluated with regard to their energetic efficiency, as is explained hereinafter by way of FIG. 2A, FIG. 2B and FIG. 2C.

Figure 2A:
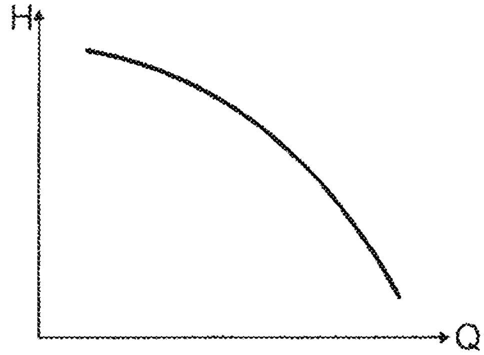
FIG. 2A is a diagram with a pump curves.

FIG. 2A shows a typical pump curve of a pump assembly, with which the delivery head is plotted in dependence on the delivery rate. The delivery head is the differential pressure between the pump inlet and pump outlet, and the delivery rate is the delivered volume flow per unit of time. The pump curve which is schematically represented by way of FIG. 2A represents a centrifugal pump at a constant speed. FIG. 2B for this shows the electrical power P of this pump assembly in dependence on the delivery rate.

Figure 2B:
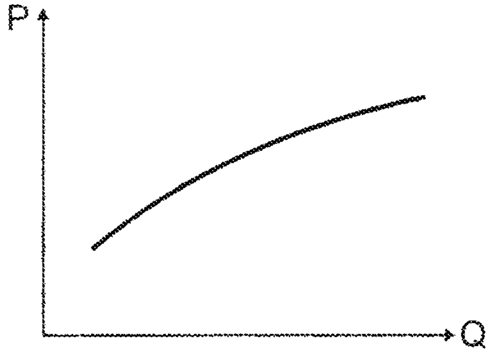
FIG. 2B is a diagram with a pump curve.
Figure 2C:
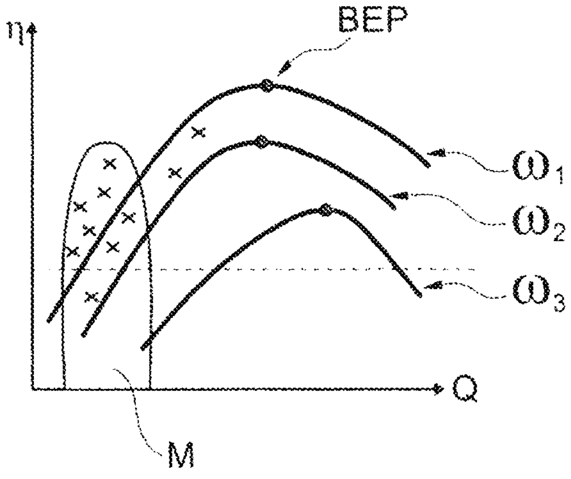
FIG. 2C is a diagram with pump curves.

The pump assembly can be operated on a multitude of different such curves according to FIGS. 2A and 2B, given the application of a power converter/frequency converter with an electronic control 6, and this is represented by way of FIG. 2C which shows three such curves $\omega_1$, $\omega_2$, $\omega_3$ which represent different speeds. These curves represent the efficiency $\eta$ in dependence on the delivery rate at a certain speed. Thereby, the efficiency is the quotient of the hydraulic power and the electrical power, is thus is one in the ideal case. The electrical power is thereby determined by the input power, which is to say the product of the current and voltage of the driving electric motor or of the driving electric motors, and with regard to the data is available in the control 6. The hydraulic power results from the product of the delivery rate, delivery head, density and gravitational acceleration. It can be computed via the differential pressure and the flow sensors. In the absence of a flow rate signal, the computation is often effected only on the basis of the differential pressure signal. As the three curves $\omega_1$, $\omega_2$ and $\omega_3$ of FIG. 2C illustrate, there is only one best efficiency point (BEP) for each speed.

These efficiency computations are carried out and stored in the electronic control 6 in temporal intervals of e.g. three minutes. The respective operating points are represented in FIG. 2C, for example by way of crosses.

The electronic control, after a predefined time now examines the efficiency at the operating points of the pump, on the basis of the previously determined efficiency curves which are either determined in running operation or are moved to in a targeted manner. One can determine whether the operating points lie in the region of the BEPs or outside them, on the basis of these operating points amid temporal correlation. Thereby, usefully a limit value of for example 30% forms the basis, so that one merely considers how many of these operating points lie outside this 30% limit and how many lie within it. Those lying outside this limit are represented in FIG. 2C by the group M.

The electronic control 6 is therefore in the position of examining whether the pump assembly can be operated in an energetically more efficient region by way of changing the setting parameters. If this is the case, then the control 6 issues a corresponding signal to the network, so that a prompting for changing the setting parameters is present at the manufacturer side or operator side.

Thereby, the setting parameters which are suitable for the pump assembly can be specified at the manufacturer side and be transmitted via the network in a wireless manner to the smartphone 9 of the operator 10 who then transmits these into the electronic control 6 of the pump assembly 1, or can also be selected and set by the operator himself.

The operating points which lie outside the 30% of the BEPS is represented in a region M in FIG. 2C. Thus there it is shown that eight of the ten operating points lie outside the 30% region and thus 80% of the operating points fall short of the set efficiency limit region. An adaptation of the setting parameters is necessary in this case.

Figure 3:
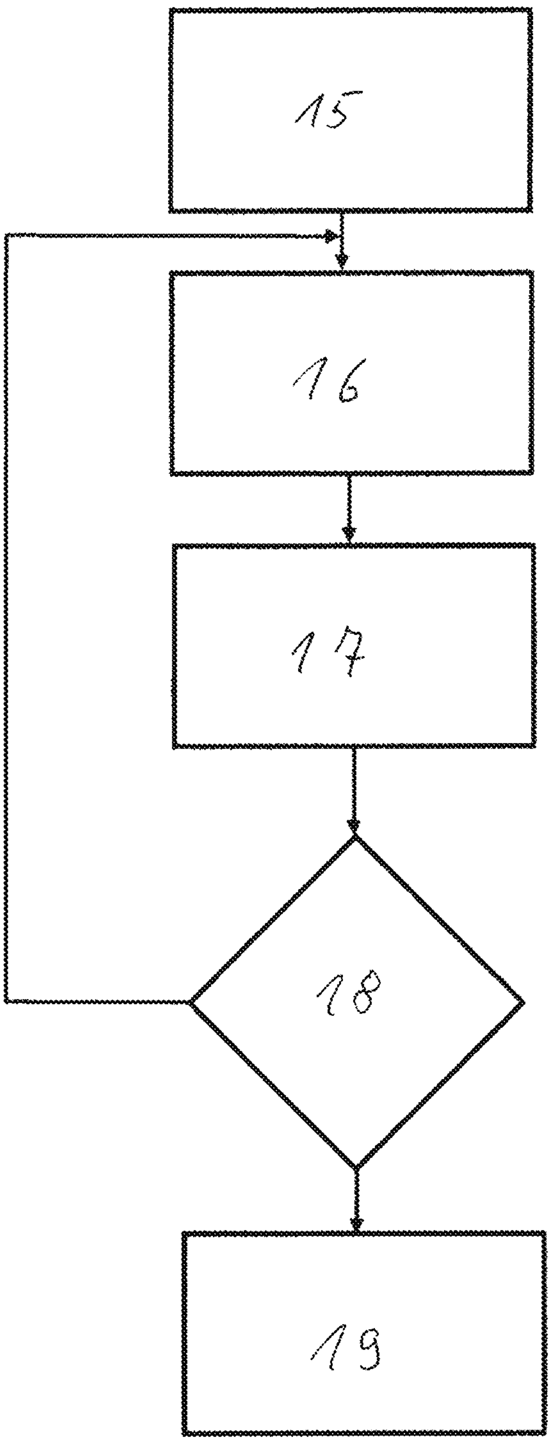
FIG. 3 is a procedural diagram.

The course of the procedure is represented by way of FIG. 3. The efficiency curves of the pump assembly are produced in a first step 15. These can either be moved to in a targeted manner or, during operation, be determined for different flow rates, in dependence on the speed which is always known at the motor side and thus at the control side. Due to the fact that the curves are never complete, either the pump assembly needs to be activated into moving along the complete curve, or one needs to interpolate. In practise, it is sufficient to determine the BEPs which result for each speed. The efficiency examination of the pump can be effected during running operation, after this data has been collected. It is to be understood that these methods can initially also temporarily overlap, which however is not a problem.

If the efficiency monitoring is now to take its course anew after a time interval for example of six months or one or two years after starting operation of the pump and the first testing, then this begins in step 16 after the expiry of the timer according to the set time of six months, one or two years, after the first examination of the pump assembly.

The efficiency of the current operating point of the pump assembly is now computed and stored, in previously defined temporal interval which is 10 minutes for example. This computation of and storage of the efficiency in the operating points is completed in the third step 17, after completion of a predefined time of 48 hours for example. Then in the fourth step 18, on the control side, the distribution of the operating points with regard to their efficiency is evaluated in each case with respect to the BEP. If a predefined percentage of the operating points, for example more than 60% of the operating points, falls short of the BEP in each case by more than 30%, then in the fifth step 19 a signal is issued, depending on the result of the evaluation, in order to change the setting parameters or also to replace the pump with a smaller one or a larger one.

If, on the control side, it is determined that the operating points with regard to their efficiency lie within the previously specified 30% limit, then the method is also started afresh, as the case may be also not until after completion of a predefined time interval, so that the pump assembly is monitored with regard to its efficiency quasi over its whole operating duration. If the setting parameters are changed after the issuing of the signal in the fifth step 19, the method is likewise reassumed in the second step 16, whereas the method begins again with the first step 15 in the case of an exchange of the pump.

While specific embodiments of the invention have been shown and described in detail to illustrate the application of the principles of the invention, it will be understood that the invention may be embodied otherwise without departing from such principles.

What is claimed is:

1. A method for operating an electronically controlled centrifugal circulation pump assembly, the method comprising the steps of:

registering operating data of the circulation pump assembly during the operation of the circulation pump assembly, characterized in that examining, after a predefined time of operation and on a basis of the registered operating data, whether the pump assembly can be operated in an energetically more favorable region of operation, the energetically more favorable region being determined from a relation of hydraulic power with electric power of the pump assembly, and upon ascertaining that the pump assembly can be operated in an energetically more favorable region of operation, issuing a signal to change the setting parameters.

2. A method according to claim 1, wherein the registering of operating data and the examining after the predefined time or a time interval is repeated after the examination has been effected.

3. A method according to claim 2, wherein the predefined time lies between an hour and seven days and/or the time interval is between 1 and 5 years.

4. A method according to claim 1, wherein after the predefined time and on the basis of the registered operating data, further examining whether one or more predefined, temporally correlated operating data limit values have been exceeded, and upon ascertaining that the one or more predefined, temporally correlated operating data limit values have been exceeded, issuing a signal for changing the setting parameters.

5. A method according to claim 1, wherein the operating data of the pump assembly is registered via an internet-based network, and on a network side of the internet-based network and after the predefined time it is examined as to whether the pump assembly can be operated in an energetically more favorable region, in order to accordingly adapt or retain the setting parameters.

6. A method according to claim 1, wherein the signal activates an optical display, activates an acoustic signal, and/or is transmitted via an internet-based network, together with location data of the pump assembly.

* * * * *